Dec. 28, 1926.

A. ANDERSON

KNOCK-OUT FOR MOLDS

Filed May 16, 1925

1,611,869

INVENTOR.
ALEXANDER ANDERSON.
BY
ATTORNEY.

Patented Dec. 28, 1926.

1,611,869

UNITED STATES PATENT OFFICE.

ALEXANDER ANDERSON, OF DETROIT, MICHIGAN, ASSIGNOR TO EARL HOLLEY, OF DETROIT, MICHIGAN.

KNOCK-OUT FOR MOLDS.

Application filed May 16, 1925. Serial No. 30,724.

This device relates to an improved knock-out adapted to be used with the machine covered by the Candler Patent #1,493,469, issued May 13, 1924.

In molding machines of the type shown in the Candler patent referred to the iron castings are ejected from the metal molds immediately after they set and while they are still red hot. Owing to the distortion that necessarily takes place in the metal mold when molten iron is poured therein, it is very difficult to keep the knock-out mechanism in exact alignment and the object of this invention is to provide a slight amount of lateral play so that the pins will not lock when they get out of alignment.

Figure 1:
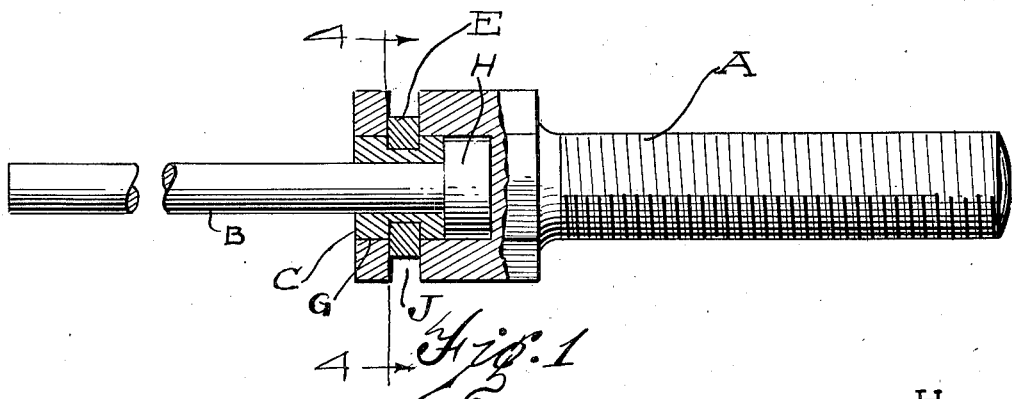
Figure 1 shows a partial cross sectional elevation on the plane 1—1 of Figure 3, showing the knock-out assembled to the shank.
Figure 2:
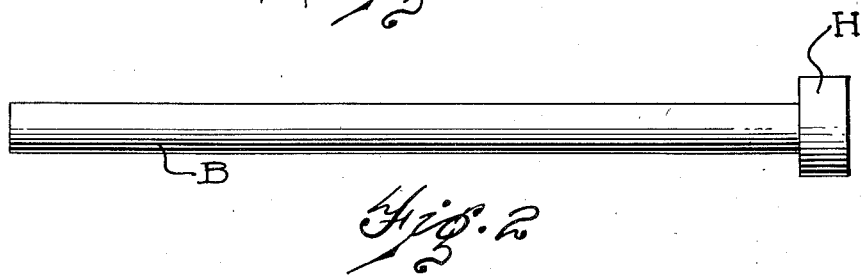
Figure 2 shows in elevation the knock-out itself.
Figure 3:
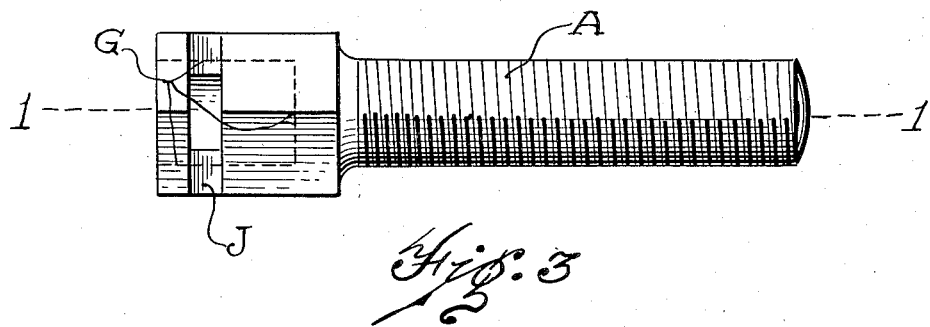
Figure 3 shows the supporting shank.
Figure 4:
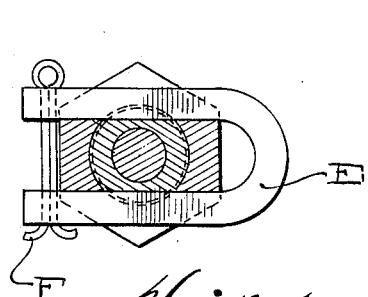
Figure 4 shows an elevation on the plane 4—4 of Figure 1.
Figure 5:
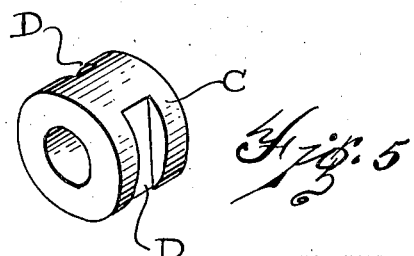
Figure 5 shows in perspective the collar used.

In the figures, A is the shank, B is the knock-out pin provided with an enlarged head H, C is the retaining collar, the inside diameter of which is a few hundredths of an inch larger than the pin B. This ring C is provided with two grooves D D. E is the U-shaped locking piece retained in place by the cotter pin F. The shank A is provided with a cavity G at one end and is threaded at the other so that it can be rigidly connected to the knock-out mechanism of the molding machine. Slots J J are provided in the enlarged portion of the shank and these slots are deep enough to break through into the cavity G.

*Assembly.*—The head H, of the knock-out pin B, fits loosely into the cavity G in the end of the shank A. The collar C slides over the knock-out pin B and engages with its head H, and also fits into the opening G of the shank A. The slots D D of the collar C, are arranged to be in alignment with the corresponding slots J J in the shank A. The U-shaped piece E is then slid into place and the cotter pin F inserted. The knock-out pin B is thus held endways, but is given a certain amount of lateral play.

What I claim is:—

1. A device for ejecting red hot castings from metal molds, comprising a knock-out pin having a shoulder, a sleeve engaging with said knock-out pin and with said shoulder, a shank provided with an enlarged end, an opening in said enlarged end adapted to receive said shoulder and said sleeve, locking means for retaining said sleeve and said pin in place.

2. An ejecting device comprising a threaded holder having a hollow enlarged end, a slotted bushing engaging therein, a knock-out pin having a head engaging with said bushing and located within said enlarged end of said holder, a keeper for retaining the bushing within said enlarged end whilst permitting a limited amount of play to said knock-out pin relative to said holder.

In testimony whereof I affix my signature.

ALEXANDER ANDERSON.